United States Patent [19]

King

[11] Patent Number: 5,228,346
[45] Date of Patent: Jul. 20, 1993

[54] METHOD OF DETERMINING GAS FLOW VOLUME

[75] Inventor: Charles W. King, Hillsdale, Mich.

[73] Assignee: Marathon Oil Company, Findlay, Ohio

[21] Appl. No.: 990,376

[22] Filed: Dec. 15, 1992

Related U.S. Application Data

[63] Continuation of Ser. No. 582,510, Apr. 8, 1991, abandoned.

[51] Int. Cl.$^5$ .............................................. G01F 1/34
[52] U.S. Cl. .................................. 73/861; 73/861.42; 73/866.3
[58] Field of Search ................ 73/861.41–861.45, 73/227, 272 R, 272 A, 866.3; 360/86, 97.01; 346/72, 134

[56] References Cited

U.S. PATENT DOCUMENTS 3,163,486  12/1964  Tomes ........................... 346/33 M
4,805,054  2/1989  Kamoto et al. .................. 360/97.01

OTHER PUBLICATIONS

Bailey Meter Co., Bull. #5, Jan. 1916, Boston, pp. 12–15.

*Primary Examiner*—Michael T. Razavi
*Assistant Examiner*—R. Biegel
*Attorney, Agent, or Firm*—Jack L. Hummel; Jack E. Ebel

[57] ABSTRACT

A method for determining the volume of gas flow in a conduit. Magnetic heads mounted on arms that oscillate in response to pressure changes record magnetic signals on rotating magnetic discs instead of the usual method of recording ink tracks on paper charts. The magnetic signals are then sensed and integrated to volumetric data by means of a computer program. Both ink and magnetic indicia may be made on the same disc if desired.

7 Claims, 2 Drawing Sheets

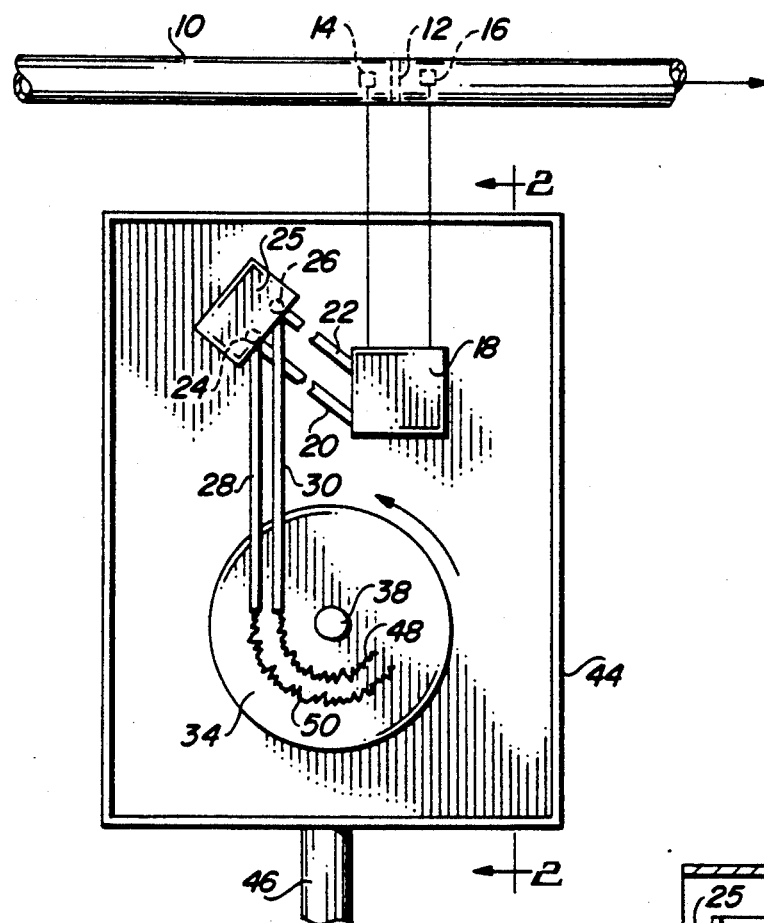
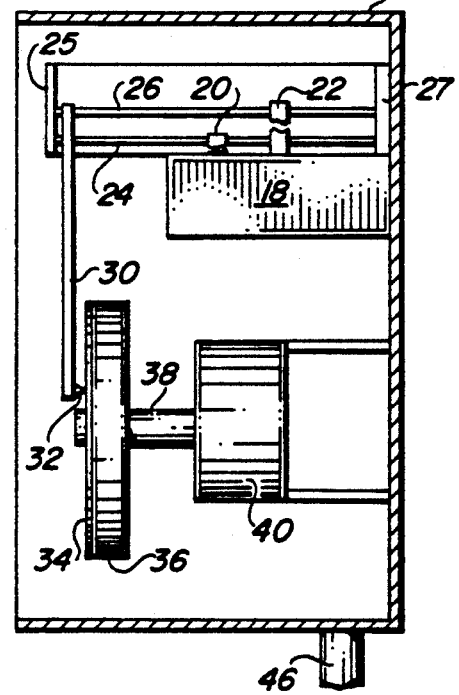
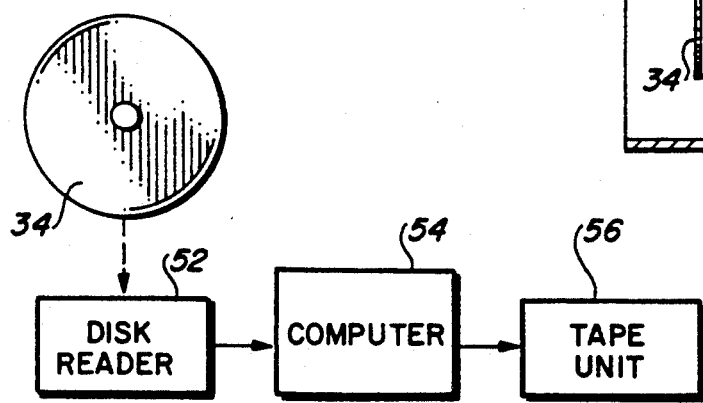

METHOD OF DETERMINING GAS FLOW VOLUME

FIELD OF THE INVENTION

This case is a continuation of Ser. No. 07/682,510 filed Apr. 8, 1991, now abandoned.

This invention relates to a method of determining the volume of flow of a gas stream. More particularly, it relates to an improved method for metering gas through use of circular chart recorders.

BACKGROUND OF THE INVENTION

The operation and management of subterraneon wells which produce hydrocarbon gas require the volume of the produced gas to be determined. This is true for gas obtained from gas wells and also for gas separated from fluid produced by oil wells. A common method of determining the volume is to take readings of the static and differential pressure of the gas as it flows through a separate meter line. Changes in pressure cause movement of recording arms on which marking pens are mounted. The pens are in contact with a circular chart rotating about a central axis so that a continuous record is obtained of these pressures over a set period of time. When the chart has completed a full rotation, a new chart replaces it in order to keep a continuous record of the gas pressures.

These gas charts must be read or integrated to convert the pressure readings to flow volume. Typically, they are sent to specialists who perform this task. In addition to the cost of the integration, the cost of paper and pens contribute to an overall cost that is quite substantial. Moreover, storage of the charts requires a large amount of space, particularly for installations in which many wells are operated. An added problem is the tendency of the ink on the paper charts to run when exposed to moisture, which can adversely affect their accuracy and integration. Still another problem involves excessive delays sometimes encountered between a chart change and the determination of gas volumes from the data on the chart.

Although it would be highly desirable to be able to overcome these problems, it is not practical to develop an entirely new system of measuring gas flow in view of the great cost of replacing all the existing meters with the hardware of such a new system. It would be far preferable to be able to improve or modify existing installations and methods in order to reduce the costs and problems referred to above.

BRIEF SUMMARY OF THE INVENTION

The invention enables the basic equipment employed in meters utilizing circular gas charts to continue to be used. The method thus involves taking pressure measurements of a gas stream in a conduit and recording the information on a rotating chart as is already known. In accordance with the invention, however, the chart is comprised of magnetic material, and indicia corresponding to the pressure measurements is magnetically recorded on the rotating chart. The volume of gas flowing through the conduit is then determined through interpretation of the magnetic indicia.

Magnetic indicia corresponding to both static and differential pressures of the flowing gas are marked on a chart in separate tracks, each corresponding to one of the measured static and differential pressures. Typically, they may consist of markings of different polarity in order to be distinguishable. The magnetic charts preferably are sensed and integrated in terms of flow volume by means of a computer program.

If desired, a permanent or temporary visual record of the recorded indicia tracks may also be provided through use of a chart or disc which permits the recording of both visual and magnetic indicia on the same surface.

The invention lowers paper and integration costs, lessens the turnaround time between collection and integration of the charts, and results in improved accuracy in determining the volume of gas flow.

The above and other aspects of the invention, as well as other benefits, will readily be apparent from the more detailed description of the preferred embodiments which follows.

BRIEF DESCRIPTION OF THE DRAWINGS

FIG. 1 is a front elevation of a circular gas chart meter incorporating the present invention, the meter being shown in an open meter box for the sake of clarity and the connection of the meter to a gas flow line being shown schematically;

FIG. 2 is a partial longitudinal sectional view through the meter box, taken along line 2—2 of FIG. 1;

FIG. 3 is a diagrammatic representation of the method of determining the volume of gas flow utilizing the present invention;

DETAILED DESCRIPTION OF THE PREFERRED EMBODIMENTS

Figure 4:
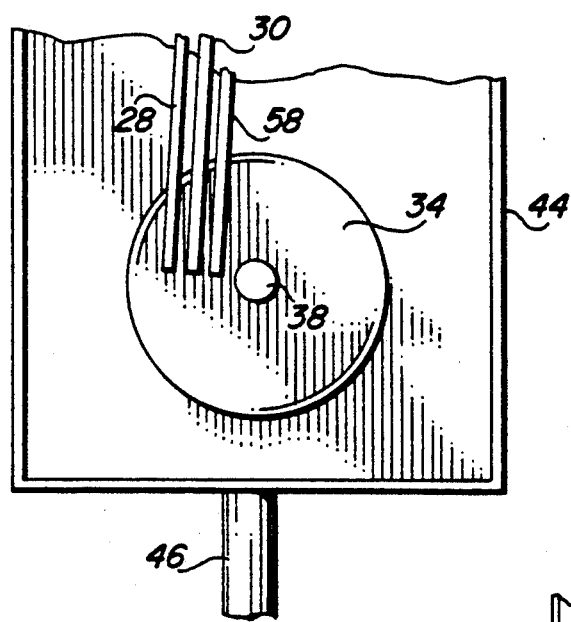
FIG. 4 is a front elevation of a chart incorporating another embodiment of the invention.

Referring to FIGS. 1 and 2, a conduit 10 functions as a meter line through which gas flows in the direction of the flow arrow. An orifice plate 12 is positioned in the line and pressure readings are taken both upstream and downstream of the plate as indicated at 14 and 16. The pressure readings are transmitted to a control unit 18 which controls the movement of linkages 20 and 22. The linkages 20 and 22 are connected to horizontal pen shafts 24 and 26 which are mounted between connected support plates 25 and 27. It will be understood that the linkages 20 and 22 ordinarily consist of a number of connected components, such as a torque shaft, drive arm, drive link and range arm, which have not been shown in detail since they are well known and form no part of the present invention. The broken showing of the linkages 20 and 22 is intended to represent the overall pen shaft oscillating assemblies.

Pen arms 28 and 30 are mounted on the pen shafts 20 and 22 for oscillating movement therewith. Marking heads 32 on the arms record indicia on circular chart 34 which is secured, by fastening means not shown, to a plate or disc 36 connected to rotating shaft 38. The shaft 38 is caused to rotate by a suitable clock mechanism or motor 40. The control unit 18, the motor 40 and pen shaft support plate 27 are secured to a box or housing 44 mounted on a support pole 46 extending up from the ground. A door which normally closes the housing has been omitted from the drawing for purpose of clarity. Typically, the indicia track 48 shown in FIG. 1 represents the static pressure measured at 14 and the other track 50 represents the differential pressure between the readings taken at 14 and 16. Through well known interpretation and integration techniques which are commonly utilized in determining gas volume by the circular gas chart method, specialists are able to determine the volume of gas flowing through the meter line 10.

The structure described thus far is well known and need not be described in greater detail. Equipment corresponding to such structure is readily commercially available, such as, for example, from ITT Barton Company, with Barton circular chart recorder model 202A being particularly pertinent as representative equipment designed to provide charts depicting the static and differential pressures in a gas meter line. It will be understood that the marking heads 32 of such a unit normally comprise ink pens which produce ink track indicia on paper charts, the paper charts and their interpretation being at the heart of the problems discussed earlier.

In accordance with the present invention, the chart 34 is a magnetic disc and the marking heads 32 carried on the arms 28 and 30 are magnetic. The magnetic heads may be in the form of permanent magnets or electromagnets, whichever is preferred. In either case the heads should produce recordings of a different nature so that they are distinguishable from each other for purpose of interpretation. For example, one of the heads would be of opposite polarity from the other.

Referring to FIG. 3, after a magnetic disc or chart has been collected it is inserted in a disk reader 52 of any suitable type. The line connecting the disk 34 and the disk reader 52 is broken to represent the fact that there is a time lag between the recording of the indicia and the insertion of the disk into the reader. The technology enabling the magnetic tracks on the charts to be identified by the disk reader is well known and may take any suitable form such as conventional tape-head and servo schemes or two- and three-dimensional arrays with small magnetic sensors capable of detecting magnetic polarization by close contact. Whatever the design, the disk reader digitizes the magnetic trails on the chart and sends the signals to a computer 54, which employs a program that reads and integrates the chart information using conventional formulas. The digitized trails are thus saved in the form of a graphic representation of the flow and by the calculated volume made by the program. Hard copy printouts can be made for permanent storage, if desired, or the results can be maintained on floppy disks or streaming tape, enabling gas flow graphs to be viewed at a later date. If tape is saved, the computer would be connected to a suitable tape unit 56. This procedure alone can reduce chart integration costs by considerable amounts.

In use, the operator of the reader 52 would be shown the result on the screen of the computer monitor in the desired volumetric units and is given the option of final approval before adding the results to the database.

As illustrated in FIG. 4, it may also be desirable to incorporate a third trail of information on the chart, such as, for example, a trail relating to gas temperature. This would require a third marking head carried on a third arm 58. The signal must be distinguished from the signals of the magnetic marking heads of arms 28 and 30. This can be accomplished in a variety of ways, such as by utilizing an AC recording signal (a± sine wave). It may of course be necessary to compare continuous tones of various frequencies during finalization of the design to result in the best method. Additional arms can be incorporated to record still more information at different frequencies as desired.

Figure 5:
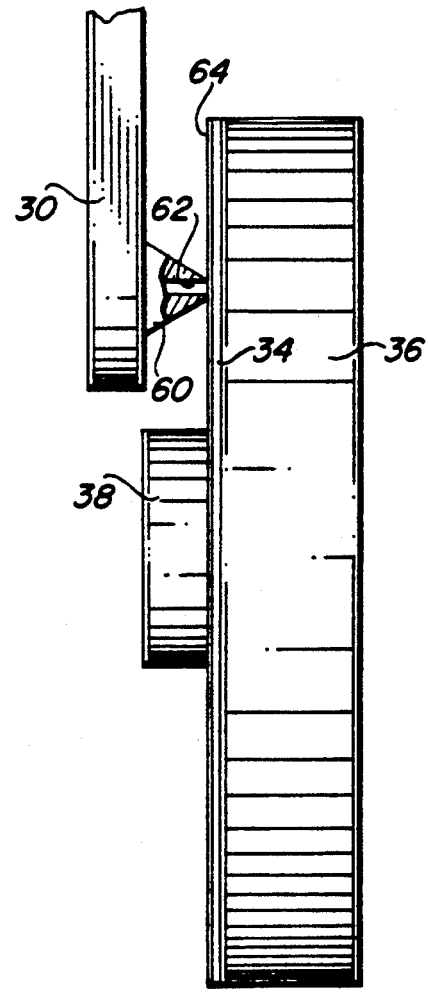
FIG. 5 is an enlarged side elevation of a marking head, shown partially in section, embodying a further embodiment of the invention.

Referring to FIG. 5, the arm 30 is shown for illustrative purposes as incorporating a special marking head 60 capable of imparting both visual and magnetic signals to the chart. Thus, while the head 60 is magnetic and capable of producing a magnetic track on a disc of magnetic material, it also includes a conduit 62 leading to the tip of the head to enable ink to be applied through the conduit outlet in the head. The chart in this embodiment is illustrated as comprising a magnetic disk 34 covered by a paper chart 64. The ink makes a visual recording on the paper chart 64, while the magnetic head 60 produces an identically configured magnetic trail on the disk 34. The paper is so thin that it does not interfere with the ability of the magnetic head to produce the trail on the disk 34. The paper chart is suitable for archiving or periodic audits by conventional integration means and is thus also available for producers or government agencies that prefer them.

If desired, the embodiment of FIG. 5 may be further modified by utilizing a washable magnetic disk on which both ink and magnetic trails can be made instead of the magnetic data and paper chart described above. This is advantageous in field situations where there is no computer available for reading and integration but a local reading is required as backup. It is noted that even in situations which do not require a visible trail to be made, it may be desirable to provide a coating on reusable magnetic disks in order to enable them to withstand head wear.

This invention can be implemented by the same equipment presently in place for making conventional circular gas charts. That is, existing meters may be retrofitted simply by replacing the ink pens with magnetic pens equipped with permanent magnets or electromagnets. In the latter case simple additional equipment would be installed to produce the necessary electrical current. The unit conventionally employed to rotate the disk and to move or oscillate the recording arms would remain the same, since the magnetic disks would be of the same dimensions as the previously used paper charts.

The invention gives greater versatility to the process of collecting the charts and reading them by enabling field personnel to either take the disks to a central office equipped with a disk reader and computer or to bring a portable computer and reader into the field. It is also contemplated to have a disk reader at each meter location, making it necessary for the field person to bring only a portable computer to the site in order to integrate the information in the field.

It will now be appreciated that the invention yields many benefits while costing very little to implement. The costs of integrating and storing charts are reduced, and the cost of paper charts and pens that are not reusable is eliminated. Operational costs due to long time lags between collecting a chart and obtaining integrated gas volumes can now be substantially reduced, and improved accuracy of information is obtained due to less information being lost between the field and the integrator and less chance of information being misread.

It should also be apparent that the invention is not necessarily limited to all the specific details described in connection with the preferred embodiments, but that changes to certain features which do not alter the overall basic function and concept of the invention may be made without departing from the spirit and scope of the invention, as defined in the appended claims.

What is claimed is:

1. A method of determining the volume of gas flowing through a conduit over a period of time, comprising the steps of:

taking pressure measurements of the static and differential pressures of the flowing gas in the conduit during said period of time;

rotating a chart in the form of a disc about a central axis during said period of time, the disc being comprised of magnetic material;

magnetically recording separate tracks of indicia on the rotating disc corresponding to the pressure measurements taken during said period of time, one of the tracks of indicia being recorded by a magnetic head mounted on an arm movable in response to changes in the static pressure and the other track of indicia being recorded by a magnetic head mounted on an arm movable in response to changes in the differential pressure, the tracks being distinguishable from each other; and determining the volume of gas flowing through the conduit during said period of time through interpretation of the different tracks of indicia by converting the magnetic indicia to digital signals and integrating the digitized indicia by means of a computer program.

2. The method of claim 1, wherein the indicia corresponding to the static pressure is recorded by a magnetic head of one polarity and the indicia corresponding to the differential pressure is recorded by a magnetic head of different polarity.

3. The method of claim 1, including the step of recording a third signal corresponding to a different condition of the gas, the third signal comprising an alternating current recording signal.

4. The method of claim 3, wherein the different condition is the temperature of the gas.

5. The method of claim 1, including the step of recording visible indicia on the disc corresponding to the magnetic indicia by marking means mounted on the movable arms so as to have both types of indicia on the same disc.

6. The method of claim 5, wherein the visible indicia is recorded on a layer of paper overlying the magnetic disc, the recording of visible indicia occurring simultaneously with the recording of the magnetic indicia on the magnetic disc.

7. The method of claim 5, wherein the visible indicia is recorded on the surface of the magnetic disc.

* * * * *